(12) United States Patent
Mathews et al.

(10) Patent No.: US 12,455,973 B1
(45) Date of Patent: Oct. 28, 2025

(54) SYSTEMS AND METHODS FOR SECURE ENCRYPTION

(71) Applicant: TripleKey, LLC, Brentwood, TN (US)

(72) Inventors: Paul Jerome Mathews, Brentwood, TN (US); Oleksandr Rozumii, Venda do Pinheiro (PT); Gonçalo Alexandre Pinto Tomás, Almada (PT)

(73) Assignee: TripleKey, LLC, Brentwood, TN (US)

( * ) Notice: Subject to any disclaimer, the term of this patent is extended or adjusted under 35 U.S.C. 154(b) by 0 days.

(21) Appl. No.: 19/038,243

(22) Filed: Jan. 27, 2025

(51) Int. Cl.
G06F 21/60 (2013.01)
G06F 21/79 (2013.01)
G06F 21/85 (2013.01)

(52) U.S. Cl.
CPC ............ *G06F 21/602* (2013.01); *G06F 21/79* (2013.01); *G06F 21/85* (2013.01)

(58) Field of Classification Search
CPC ......... G06F 21/602; G06F 21/79; G06F 21/85
See application file for complete search history.

(56) References Cited

U.S. PATENT DOCUMENTS

| | | | |
|---|---|---|---|
| 10,992,469 | B2 | 4/2021 | Cheng et al. |
| 11,100,497 | B2 | 8/2021 | McCauley et al. |
| 11,233,653 | B2 | 1/2022 | Michael et al. |
| 2001/0056539 | A1 | 12/2001 | Pavlin et al. |
| 2005/0010788 | A1 | 1/2005 | Craft |
| 2007/0198857 | A1 | 8/2007 | Gidalov |
| 2012/0331304 | A1 | 12/2012 | She et al. |
| 2013/0145173 | A1 | 6/2013 | Shablygin et al. |
| 2015/0222607 | A1 | 8/2015 | Van Roermund et al. |
| 2015/0371170 | A1 | 12/2015 | Magrath |
| 2016/0012235 | A1 | 1/2016 | Lee et al. |
| 2016/0234229 | A1 | 8/2016 | Carpenter et al. |
| 2018/0367316 | A1 | 12/2018 | Cheng et al. |
| 2019/0129865 | A1* | 5/2019 | Fenster .................... G06F 1/30 |
| 2019/0379542 | A1* | 12/2019 | Michael ............. G06F 13/4282 |
| 2020/0084187 | A1* | 3/2020 | Bouaziz .................. G06F 21/82 |
| 2021/0056233 | A1* | 2/2021 | Camery ................ H04L 9/0822 |
| 2021/0319513 | A1 | 10/2021 | Prates De Oliveira et al. |
| 2021/0326476 | A1* | 10/2021 | Su ............................. H04L 9/50 |

(Continued)

OTHER PUBLICATIONS

Paul, Gribble, "7. Memory: Stack vs Heap", Retrieved from the Internet: < URL: https://gribblelab.org/teaching/CBootCamp/7_Memory_Stack_vs_Heap.html> (Year: 2012).*

(Continued)

*Primary Examiner* — Sangseok Park
(74) *Attorney, Agent, or Firm* — COOLEY LLP

(57) ABSTRACT

In some embodiments, a method includes receiving encrypted data at a volatile memory of a first device; in response to receiving the encrypted data at the volatile memory of the first device: retrieving an asymmetric cryptographic key at the volatile memory of the first device, and retrieving a symmetric cryptographic key from a non-volatile memory of a second device to cause the symmetric cryptographic key to be stored in the volatile memory of the first device and not a non-volatile memory of the first device; and decrypting the encrypted data based on the asymmetric cryptographic key and the symmetric cryptographic key to produce unencrypted data, without causing the unencrypted data to be stored in the non-volatile memory of the first device.

19 Claims, 8 Drawing Sheets

(56) References Cited

U.S. PATENT DOCUMENTS

| | | | |
|---|---|---|---|
| 2021/0326787 A1 | 10/2021 | Gupta | |
| 2022/0058747 A1 | 2/2022 | Crabtree et al. | |
| 2022/0210200 A1 | 6/2022 | Crabtree et al. | |
| 2022/0321340 A1 | 10/2022 | Tsitrin et al. | |
| 2022/0405405 A1* | 12/2022 | Rexilius | G06F 21/602 |
| 2023/0297678 A1 | 9/2023 | Martinic | |
| 2024/0039954 A1 | 2/2024 | Shete et al. | |
| 2024/0086543 A1* | 3/2024 | Hwang | H04L 9/3073 |

OTHER PUBLICATIONS

Advanced Card Systems, Inc. "CryptoMate64 Cryptographic USB (Token)," webpage <http://www.acs.com.hk/en/products/18/cryptomate64-usb-cryptographic-tokens/>, 2 pages, archived on Jun. 22, 2024, retrieved from Internet Archive Wayback Machine <https://web.archive.org/web/20240622213339/http://www.acs.com.hk/en/products/18/cryptomate64-usb-cryptographic-tokens/> on Jan. 28, 2025.

Alhussein, Abdullah, "PKI-Encryption-Decryption-PDF-USB-Token," webpage <https://github.com/AbdullahAlhussein/PKI-Encryption-Decryption-PDF-USB-Token?tab=readme-ov-file#pki-encryption-decryption-pdf-usb-token>, 8 pages, retrieved online on Jan. 28, 2025.

Author Unknown "Best practices for securing accounts," webpage <https://docs.github.com/en/code-security/supply-chain-security/end-to-end-supply-chain/securing-accounts>, 4 pages, archived on Dec. 27, 2024, retrieved from Internet Archive Wayback Machine <https://web.archive.org/web/20241227194648/https://docs.github.com/en/code-security/supply-chain-security/end-to-end-supply-chain/securing-accounts> on Jan. 28, 2025.

Author Unknown "Connecting to GitHub with SSH," webpage <https://docs.github.com/en/authentication/connecting-to-github-with-ssh>, 2 pages, archived on Jan. 1, 2025, retrieved from Internet Archive Wayback Machine <https://web.archive.org/web/20250102053640/https://docs.github.com/en/authentication/connecting-to-github-with-ssh> on Jan. 28, 2025.

Author Unknown "Key based encryption for files with the key stored on a USB drive?" webpage <https://security.stackexchange.com/questions/155250/key-based-encryption-for-files-with-the-key-stored-on-a-usb-drive>, 2 pages, archived on Apr. 21, 2021, retrieved from Internet Archive Wayback Machine <https://web.archive.org/web/20210421035605/https://security.stackexchange.com/questions/155250/key-based-encryption-for-files-with-the-key-stored-on-a-usb-drive> on Jan. 28, 2025.

Author Unknown "Managing your personal access tokens," webpage <https://docs.github.com/en/authentication/keeping-your-account-and-data-secure/managing-your-personal-access-tokens>, 7 pages, archived on Jan. 2, 2025, retrieved from Internet Archive Wayback Machine <https://web.archive.org/web/20250102052626/https://docs.github.com/en/authentication/keeping-your-account-and-data-secure/managing-your-personal-access-tokens> on Jan. 28, 2025.

Author Unknown "Using PIV for SSH through PKCS #11," webpage <https://developers.yubico.com/PIV/Guides/SSH_with_PIV_and_PKCS11.html>, 3 pages, archived on Jan. 2, 2025, retrieved from Internet Archive Wayback Machine <https://web.archive.org/web/20250102030336/https://developers.yubico.com/PIV/Guides/SSH_with_PIV_and_PKCS11.html> on Jan. 28, 2025.

Author Unknown "yubico, Compatible YubiKeys," webpage <https://www.yubico.com/works-with-yubikey/catalog/github/>, 9 pages, archived on Jan. 26, 2025, retrieved from Internet Archive Wayback Machine <<https://web.archive.org/web/20250126182644/https://www.yubico.com/works-with-yubikey/catalog/github/ > on Jan. 28, 2025.

GoldKey Security Services "GoldKey Security Token, " webpage <https://www.goldkey.com/goldkey-security-token/>, 6 pages, archived on Sep. 26, 2024, retrieved from Internet Archive Wayback Machine <https://web.archive.org/web/20240926172702/https://www.goldkey.com/goldkey-security-token/> on Jan. 28, 2025.

Jones, Kevin, "Security keys are now supported for SSH Git operations," blog <https://github.blog/engineering/platform-security/security-keys-supported-ssh-git-operations/>, 12 pages, May 10, 2021, retrieved from Internet Archive Wayback Machine <https://web.archive.org/web/20250124122445/https://github.blog/engineering/platform-security/security-keys-supported-ssh-git-operations/> on Jan. 28, 2025.

Tecxoft "USB Tokens and Smart Cards," webpage <https://tecxoft.com/usbtoken.php>, 2 pages, archived on Aug. 3, 2024, retrieved from Internet Archive Wayback Machine <https://web.archive.org/web/20240803171829/https://tecxoft.com/usbtoken.php> on Jan. 28, 2025.

GoldKey Security Services "Master and GrandMaster GoldKey Tokens Powerful Encryption Without Locking You Out," webpage <https://www.goldkey.com/goldkey-master-token/>, 8 pages, archived on Dec. 8, 2024, retrieved from Internet Archive Wayback Machine <https://web.archive.org/web/20241208142536/https://www.goldkey.com/goldkey-master-token/> on Feb. 3, 2025.

* cited by examiner

SYSTEMS AND METHODS FOR SECURE ENCRYPTION

FIELD

One or more embodiments described herein relate to systems and computerized methods for secure encryption and decryption. More specifically, one or more embodiments described herein relate to systems and computerized methods for secure encryption and decryption using asymmetric and symmetric cryptographic techniques.

BACKGROUND

Increases in the capabilities of electronic devices have led to significant increases in the amount of digital information stored within those devices. In some instances the subject matter of the data can relate to a person's identity and/or can otherwise be personally sensitive, highly confidential, and/or the like. The need to securely store and share information among reliable parties continues to present challenges. As such, a need exists for methods and apparatus to securely store and share information.

SUMMARY

In some embodiments, a method includes receiving encrypted data at a volatile memory of a first device; in response to receiving the encrypted data at the volatile memory of the first device: retrieving an asymmetric cryptographic key at the volatile memory of the first device, and retrieving a symmetric cryptographic key from a non-volatile memory of a second device to cause the symmetric cryptographic key to be stored in the volatile memory of the first device and not a non-volatile memory of the first device; and decrypting the encrypted data based on the asymmetric cryptographic key and the symmetric cryptographic key to produce unencrypted data, without causing the unencrypted data to be stored in the non-volatile memory of the first device.

DETAILED DESCRIPTION

Figure 1:
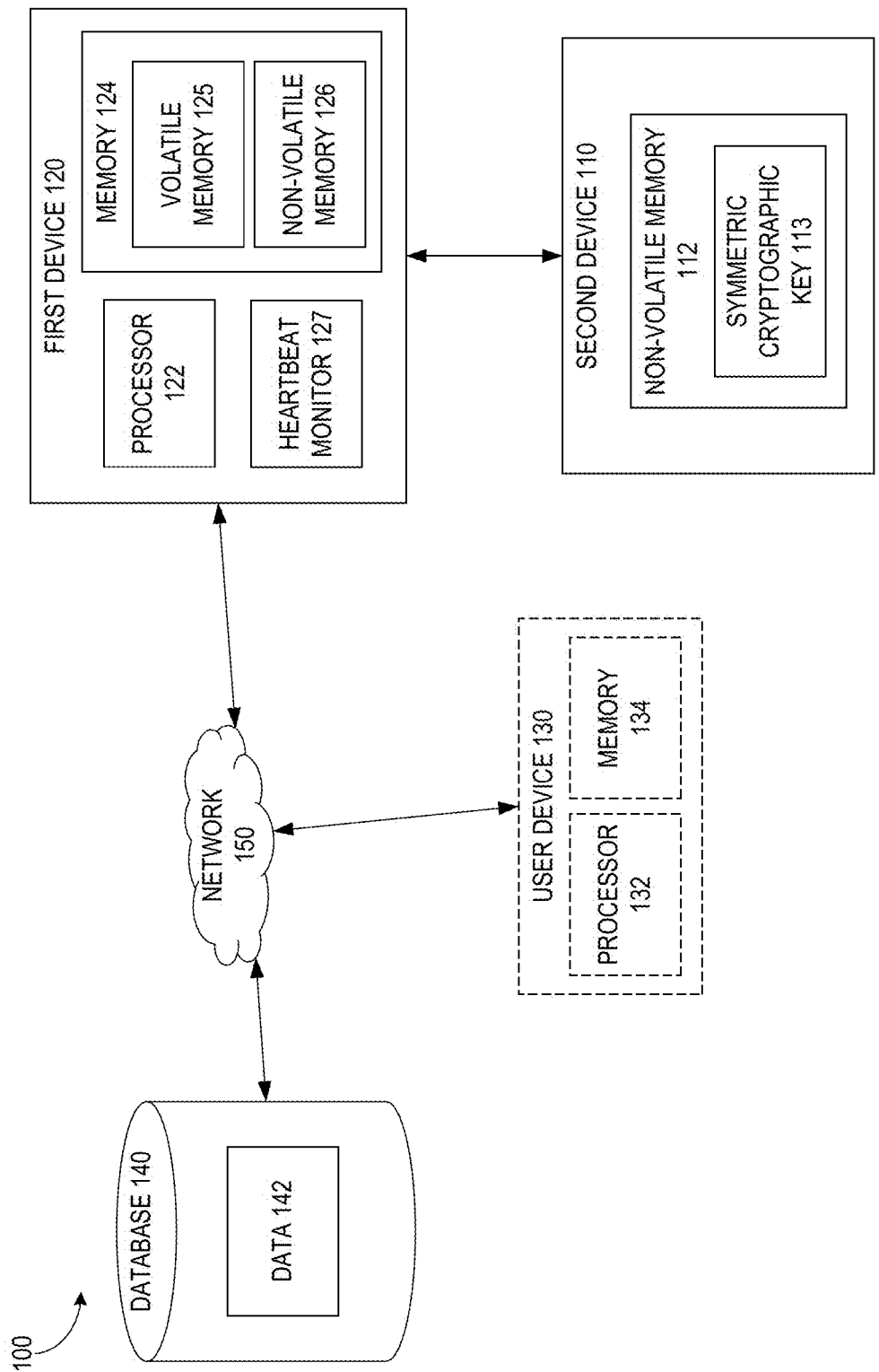
FIG. 1 shows a system block diagram of a cryptographic system, according to an embodiment.

FIG. 1 shows a system block diagram of a cryptographic system 100, according to an embodiment. The cryptographic system 100 includes a database 140, a network 150, a first device 120, a second device 110 and optionally a user device 130. The cryptographic system 100 can be a system for encrypting data and decrypting data.

The database 140 can be any suitable data storage structure(s) such as, for example, a table, repository, a relational database, an object-oriented database, an object-relational database, a structured query language (SQL) database, an extensible markup language (XML) database, and/or the like.

The database 140 includes data 142. Data 142 can be any suitable data having any suitable form and/or including or representing any suitable information. For example, in some instances, the data 142 can be a portion of code of a codebase and/or a codebase, a document including personally sensitive information and/or personally identifiable information (e.g., social security numbers, credit card accounts, financial transactions, diagnostic and billing codes, etc.), a document including confidential information, a document including proprietary information, a document containing classified information, and/or a document including any other suitable information. The data 142 can be encrypted data and/or unencrypted data.

The network 150 can be any type of network(s) such as, for example, a local area network (LAN), a wireless local area network (WLAN), a wide area network (WAN), a metropolitan area network (MAN), a worldwide interoperability for microwave access network (WiMAX), a telephone network (such as the Public Switched Telephone Network (PSTN) and/or a Public Land Mobile Network (PLMN)), an intranet, the Internet, an optical fiber (or fiber optic)-based network, a cellular network, and/or any other suitable network. The network can include various configurations and protocols, including, for example, short range communication protocols, Bluetooth®, Bluetooth® LE, the Internet, World Wide Web, intranets, virtual private networks, wide area networks, local networks, private networks using communication protocols proprietary to one or more companies, Ethernet, Wi-Fi® and/or Hypertext Transfer Protocol (HTTP), cellular data networks, satellite networks, free space optical networks and/or various combinations of the foregoing. Such communication can be facilitated by any device capable of transmitting data to and from other compute devices, such as a modem(s) and/or a wireless interface(s). The network 150 can be communicatively coupled to the database 140, the user device 130, and the first device 120.

The first device 120 can be any suitable hardware-based computing device configured to send and/or receive data via the network 150 and configured to store data (e.g., a cryptographic key, encrypted data, etc.). For example, in some embodiments, the first device 120 can be, for example, a personal computer (PC), device, a workstation, smartphone, smartwatch, tablet, laptop computer, and/or the like. In some implementations, the first device 120 can receive inputs and/or data directly from a user interacting with the first device 120 (e.g., via an input device).

The first device 120 includes a processor 122 and a memory 124. The processor 122 can be a hardware-based integrated circuit (IC) and/or any other suitable processing device configured to run or execute a set of instructions and/or code stored, for example, in the memory 124. For example, the processor 122 can be a general-purpose processor, a central processing unit (CPU), an accelerated processing unit (APU), an application specific integrated circuit (ASIC), a network processor, a front-end processor, a field programmable gate array (FPGA), a programmable logic array (PLA), and/or the like. The processor 122 can be in communication with the memory 124 via any suitable interconnection, system bus, circuit, and/or the like. As described in further detail herein, the processor 122 can include any number of engines, processing units, cores, etc. configured to execute code, instructions, modules, processes, and/or functions associated with encrypting data and defining one or more rules governing access to the encrypted data.

The memory 124 can be, for example, a stack memory, a random-access memory (RAM), a memory buffer, a magnetic disk (e.g., hard drive memory), a read-only memory (ROM), an erasable programmable read-only memory (EPROM), a flash memory, and/or the like. The memory 124 can be configured to store, for example, one or more software modules and/or code that can include instructions that can cause the processor 122 to perform one or more processes, functions, and/or the like (e.g., processes, functions, etc. associated with encrypting data and/or decrypting data, and/or defining one or more rules governing access to the encrypted data).

The memory 124 includes volatile memory 125, non-volatile memory 126, and a heartbeat monitor 127. The volatile memory 125 can be, for example, a stack memory, a RAM, and/or a cache memory. In some implementations, the volatile memory 125 can store cryptographic keys such as, for example, asymmetric cryptographic keys including public and/or private keys, and/or symmetric cryptographic keys. In some implementations, the volatile memory 125 can store data such as, for example, raw data, encrypted data, intermediate data, and/or unencrypted data. The non-volatile memory 126 can be, for example, a hard drive memory, a solid-state drive memory, a flash memory, a ROM, and/or an EPROM. The non-volatile memory 126 can store data such as, for example, raw data, encrypted data, intermediate data, asymmetric keys, and/or unencrypted data.

The memory 124 can include code and/or instructions to cause processor 122 to execute encryption and/or decryption. In some implementations, the first device 120 can include a circuit, and/or electronics for encryption and decryption. Encryption can include encoding data using cryptographic processes/algorithms to produce encrypted data (also referred to as ciphertext). In some implementations, the encrypted data can be sent by a user to a recipient (e.g., the first device 120 can send encrypted data via the network 150 to the user device 130). Decryption can include decoding encrypted data using cryptographic processes and/or algorithms to produce unencrypted data. Cryptographic processes/algorithms can include, for example, Advanced Encryption Standard (AES), Rivest-Shamir-Adleman (RSA), Elliptic Curve Cryptography (ECC), Diffie-Hellman, Transport Layer Security (TLS), and Triple Data Encryption Standard (DES). Cryptographic processes and/or algorithms can include cryptographic keys.

Cryptographic keys can include, for example, asymmetric cryptographic keys and symmetric cryptographic keys, The asymmetric cryptographic keys can include a public cryptographic key (also referred to herein as a public key) and a mathematically related private cryptographic key (also referred to herein as a private key). A public-private key pair can be generated for each device in a set of devices. A first device having a public-private key pair can distribute the public key to a second device in the set of devices in response to a request from the second device to send an encrypted data to the first device. The second device can use the public key of the first device to encrypt the data. In response to receiving the encrypted data, the first device can use the corresponding private key to unencrypt the encrypted data. The symmetric cryptographic keys can include a single cryptographic key (also referred to herein as the symmetric key). The single cryptographic key can be used to both encrypt and decrypt data.

The heartbeat monitor 127 can be hardware (e.g., a circuit and/or electronics) and/or code and/or instructions (e.g., stored in memory 124) that, when executed by the processor 122, can send and/or detect a signal (also referred to herein as a heartbeat signal) associated with the second device 110 to verify that the second device 110 is coupled to the first device 120, as described in further detail herein. The heartbeat monitor 127 can send and/or detect the heartbeat signal periodically, sporadically, or continuously to verify that the second device 110 remains coupled to the first device 120. Specifically, in some implementations, the heartbeat monitor 127 can periodically, sporadically, or continuously send a first signal to the second device 110. The second device 110 can respond to the first signal with a second signal. The heartbeat monitor 127 can verify the presence of the second device 110 based on receiving the second signal (e.g., within a predetermined time period from sending the first signal). In response to the heartbeat monitor 127 verifying that the second device 110 remains coupled to the first device 120, the processor 122 can allow decryption and/or encryption. In response to the heartbeat monitor 127 detecting an absence of the heartbeat signal (e.g., the heartbeat monitor 127 not receiving the second signal within a predetermined time period), the processor 122 can halt decryption and/or encryption. For example, the processor 122 can cause an asymmetric cryptographic key (e.g., a public key if encrypting or a private key if decrypting) and/or a symmetric cryptographic key to be removed from the memory 124 (e.g., volatile memory 125) of the first device 120.

The second device 110 can be or include, for example, a Universal Serial Bus (USB) drive, a removable Universal Serial Bus (USB) drive, a Peripheral Component Interconnect Express (PCIe) drive, a one-time programmable (OTP) memory, a memory card (e.g., a secure digital (SD) card and/or a microSD card), a hard drive, a solid-state drive and/or other device that can be removably and/or communicatively coupled to the first device 120. The second device 110 can include non-volatile memory 112. Non-volatile memory 112 can be, for example, a flash memory, a ROM, an EPROM, a hard drive memory, and/or a solid-state drive memory. The second device 110 can be removably coupled to the first device 120. The second device 110 can be physically coupled (wired connection) and/or communicatively coupled (e.g., wireless connection such as Bluetooth, Wi-Fi, or a network, such as an organization's intranet) to the first device 120.

Non-volatile memory 112 can include and/or store a symmetric cryptographic key 113. Symmetric cryptographic key 113 can be data that is used for both encryption and decryption. The data can be, for example, a string of characters and/or numbers. The symmetric cryptographic key 113 can be used in any suitable symmetric encryption process and/or algorithm executed by the processor 122 of first device 120 such as, for example, Advanced Encryption Standard (AES), Data Encryption Standard (DES), Rivest Cipher 4 (RC4), Rivest Cipher 6 (RC6), and/or the like.

In some implementations, the second device 110 can have a unique serial number and/or identifier. In some implementations, as described in further detail herein, the first device 120 can confirm the serial number and/or identifier of the second device 110 to ensure the correct second device 110 is coupled to the first device 120. This can ensure that the correct symmetric cryptographic key 113 is used to encrypt and/or decrypt data. The heartbeat monitor 127 can also use the serial number and/or identifier of the second device 110 to confirm the correct second device is connected to continue encryption and/or decryption.

The user device 130 can be any suitable hardware-based computing device configured to send and/or receive data via the network 160 (e.g., send a request to the first device 120 to decrypt encrypted data). For example, in some implementations, the user device 130 can be, for example, a PC, a workstation, a smartphone, a tablet, a smartwatch, a laptop computer, and/or the like. The user device 130 includes a processor 132 and a memory 134.

The processor 132 can be structurally and/or functionally similar to the processor 122. The processor 132 can execute code stored in memory 134 to perform functions and/or processes at user device 130.

The memory 134 can be, for example, a random-access memory (RAM), a memory buffer, a magnetic disk (e.g., hard drive memory), a read-only memory (ROM), an erasable programmable read-only memory (EPROM), a flash memory, and/or the like. The memory 134 can be configured to store, for example, one or more software modules and/or code that can include instructions that can cause the processor 132 to perform one or more processes, functions, and/or the like (e.g., processes, functions, etc. associated with encrypting data and/or defining one or more rules governing access to the encrypted data).

In some implementations, user device 130 can send encrypted data to and/or receive encrypted data from first device 120 and/or database 140. The user device 130 can encrypt and/or decrypt data similar to the functions described herein with respect to first device 120. While not shown in FIG. 1, in some implementations, user device 130 can be coupled to a second device structurally and functionally similar to second device 110. This can allow user device 130 to access symmetric cryptographic key 113. In some implementations, instead of being coupled to a second device, the user device 130 can access second device 110 to obtain symmetric cryptographic key 113 (e.g., via network 150, via an organization's intranet, etc.). Having access to symmetric cryptographic key 113 allows the user device 130 to perform symmetric encryption and decryption, similar to the symmetric encryption and decryption described with respect to first device 120. Moreover, in some implementations, the user device 130 can store and/or access asymmetric encryption keys, allowing the user device 130 to perform asymmetric encryption and decryption, similar to the asymmetric encryption and decryption described with respect to first device 120.

Figure 2A:
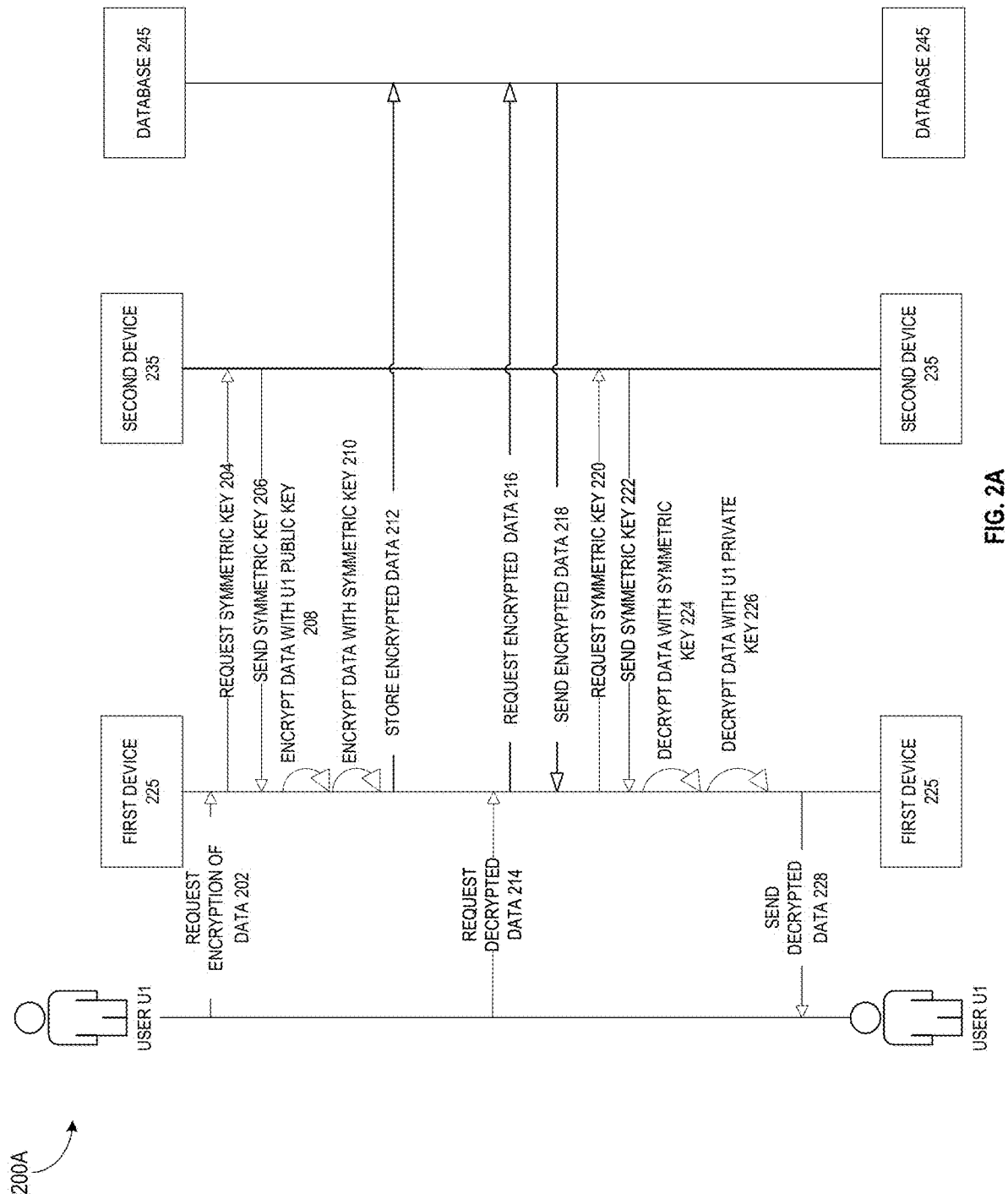
FIG. 2A shows a signal flow diagram of a cryptographic service, according to an embodiment.

FIG. 2A shows a signal flow diagram 200A, according to an embodiment. Signal flow diagram 200A includes a user U1, a first device 225, a second device 235, and a database 245. The first device 225, the second device 235, and the database 245 can be functionally and structurally similar to the first device 120, the second device 110, and database 140 of FIG. 1, respectively. Signal flow diagram 200A illustrates a process of a first device 225 encrypting and decrypting data. Steps illustrated in FIG. 2A as being performed by a device can be performed by hardware and/or software of that device. For example, steps performed by the first device 225 can be performed by a processor (e.g., processor 122 of FIG. 1) executing code stored in a memory (e.g., memory 124 of FIG. 1).

At 202, the user U1 can submit a request to encrypt data at the first device 225. In some instances, the user U1 can provide the data to the first device 225. In some instances, the first device 225 can retrieve the data from a non-volatile memory of the first device 225. In some instances, the first device 225 can retrieve the data from a different device (not shown in FIG. 2A) and/or a database (e.g., database 245 and/or another database). After retrieving the data, the first device 225 can store the data at, for example, a volatile memory of the first device 225 (e.g., volatile memory 125 of first device 120).

At 204, in response to the request, the first device 225 can submit a request to the second device 235 for a symmetric key of the second device 235. For example, the second device 235 can store a symmetric key (e.g., symmetric cryptographic key 113 of FIG. 1) in a non-volatile memory (e.g., non-volatile memory 112 of FIG. 1).

At 206, in response to the request, the second device 235 can send the symmetric key from a non-volatile memory of the second device 235 to the first device 225. Specifically, when the second device 235 is connected to first device 225 (e.g., physically and/or securely communicatively), the second device 235 can send the symmetric key to the first device 225 upon receiving the request at 204.

The first device 225 can store the symmetric key at a volatile memory of the first device 225. The first device 225 can also store a public key of the user U1 at a volatile memory (e.g., volatile memory 125 of FIG. 1) and/or non-volatile memory (e.g., non-volatile memory 126 of FIG. 1) of the first device 225.

At 208, the first device 225 (e.g., using a processor such as processor 122 of FIG. 1) can encrypt the data with the public key of the user U1 to produce intermediate data. Such encryption can be performed using any suitable asymmetric encryption method and/or algorithm as described herein. The intermediate data can be stored in the memory (e.g., volatile memory and/or non-volatile memory) of the first device 225.

At 210, the first device 225 can encrypt the intermediate data with the symmetric key to produce encrypted data. Such encryption can be performed using any suitable symmetric encryption method and/or algorithm as described herein. The encrypted data can be stored in the memory (e.g., volatile memory and/or non-volatile memory) of the first device 225. In some implementations, after encryption of the data, the symmetric key can be removed from the memory of the first device 225.

At 212, the first device 225 can send the encrypted data to the database 245. The database 245 can store the encrypted data for future retrieval and/or use.

At a time after storing the encrypted data at the database 245, the user can request to access the data. Specifically, in some implementations, at 214, the user U1 can submit a request to access decrypted data at the first device 225. In some implementations, the request can include an identification of the data to retrieve and/or access.

At 216, in response to the request at 214, the first device 225 can request the identified encrypted data from the database 245. At 218, in response to the request, the database 245 can send the encrypted data to the first device 225. The first device 225 can store the encrypted data at the volatile memory and/or non-volatile memory of the first device 225.

At 220, the first device 225 can send a request to the second device 235 for a symmetric key of the second device 235. At 222, in response to the request, the second device 235 can send the symmetric key to the first device 225. The first device 225 can store the symmetric key at the volatile memory of the first device 225. The first device 225 can also store a private key of the user U1 (paired with the public key of the user U1) at the volatile memory and/or the non-volatile memory of the first device 225.

At 224, the first device 225 can decrypt the encrypted data using the symmetric key to produce intermediate data. Such decryption can be performed using any suitable symmetric decryption method and/or algorithm as described herein. The intermediate data can be stored in the memory (e.g., volatile memory and/or non-volatile memory) of the first device 225. In some implementations, after decryption of the data, the symmetric key can be removed from the memory of the first device 225.

At 226, the first device 225 can decrypt the intermediate data using the private key of user U1 to produce unencrypted or decrypted data. Such encryption can be performed using any suitable symmetric encryption method and/or algorithm as described herein. The decrypted data can be stored in the memory (e.g., volatile memory and/or non-volatile memory) of the first device 225. At 228, the first device 225 can send the decrypted data to the user U1 (e.g., the first device 225 can present the decrypted data to the user U1 via an output device (e.g., display, speaker, etc.) of the first device 225.

In some implementations, throughout the encryption and decryption processes, the first device 225 can monitor the presence of the second device 235 via a heartbeat monitor (e.g., heartbeat monitor 127 of FIG. 1). If the heartbeat monitor does not detect the presence of the second device 235 (e.g., does not receive a heartbeat signal as described herein), the first device 225 can remove the symmetric key from the volatile memory of the first device 225 and halt encryption and/or decryption.

In some implementations, the second device 235 can have and/or store a unique serial number and/or identifier. In some implementations, the first device 225 can confirm the serial number and/or identifier of the second device 235 to ensure the correct second device 235 is coupled to the first device 225. This can ensure that the correct symmetric cryptographic key is used to encrypt and/or decrypt data. The heartbeat monitor of the first device 225 can also use the serial number and/or identifier of the second device 235 to confirm the correct second device is connected to continue encryption and/or decryption. More specifically, the heartbeat monitor of the first device 225 can periodically, sporadically and/or continuously send a request to the second device 235 for the serial number and/or identifier of the second device 235. In response, the second device 235 can send the serial number and/or identifier of the second device 235 to the first device 225. The processor of the first device 225 can compare the received serial number and/or identifier of the second device 235 to an expected serial number and/or identifier (e.g., stored in a memory (e.g., non-volatile memory) of the first device 225). If the serial numbers and/or identifiers match, the encryption and/or decryption process can continue. If, however, the serial numbers and/or identifiers don't match, the encryption and/or decryption process can be halted and the symmetric key can be removed from the memory of the first device 225. This process can ensure that the correct second device is coupled to the correct first device.

While shown and described in FIG. 2A as first encrypting the data with a user's public key to produce intermediate data and then encrypting the intermediate data with the symmetric key to produce encrypted data, in some implementations the data can be first encrypted using the symmetric key to produce intermediate data and then encrypting the intermediate data using the user's public key to produce encrypted data. Similarly, while shown and described in FIG. 2A as first decrypting the encrypted data with the symmetric key to produce intermediate data and then decrypting the intermediate data with the user's private key to produce decrypted data, in some implementations the data can be first decrypted using the user's private key to produce intermediate data and then decrypting the intermediate data using the symmetric key to produce decrypted data.

Figure 2B:
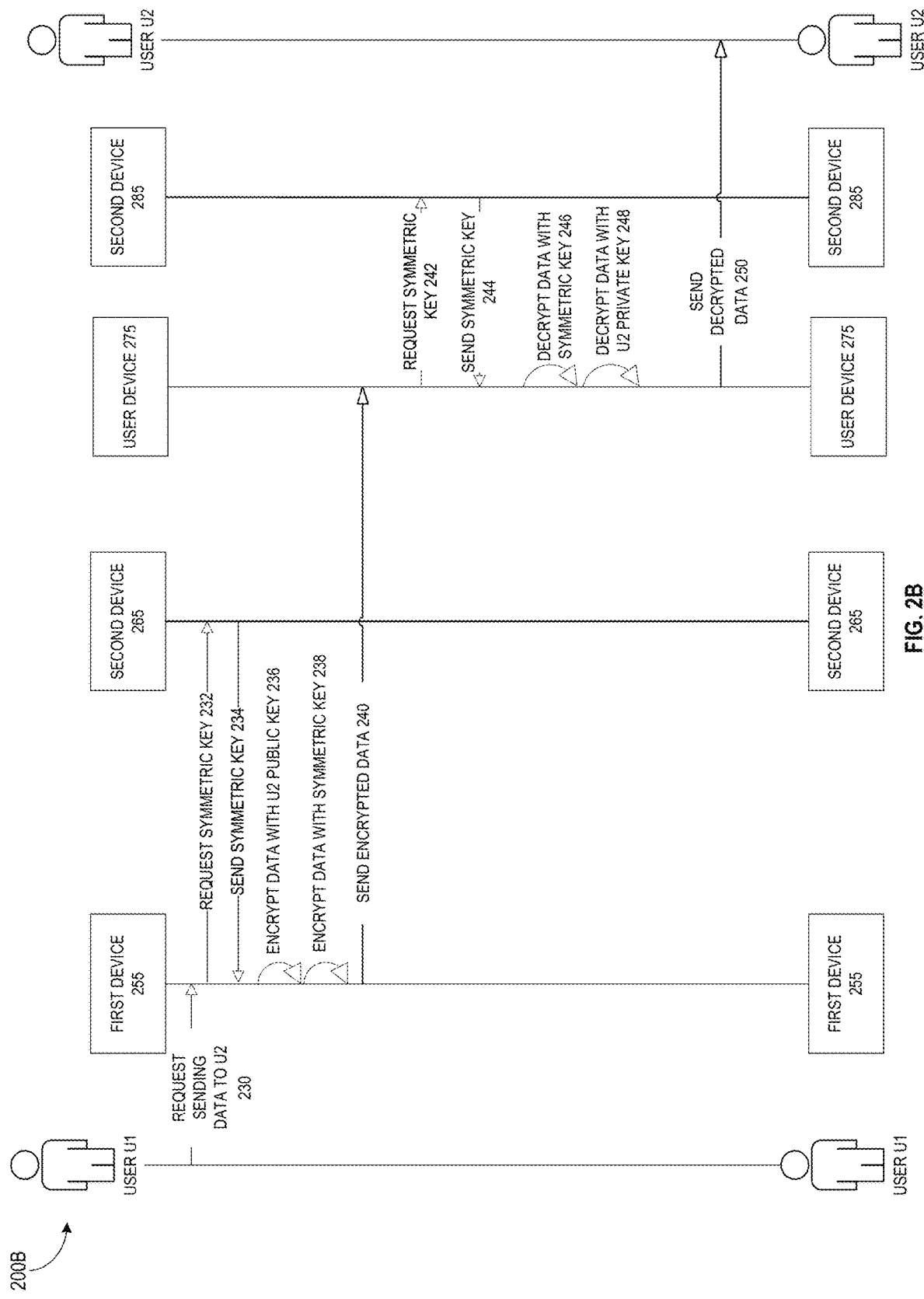
FIG. 2B shows a signal flow diagram of a cryptographic service, according to an embodiment.

FIG. 2B shows a signal flow diagram 200B, according to an embodiment. Signal flow diagram 200B includes a user U1, a user U2, a first device 255, a second device 265, a user device 275, and a second device 285. The first device 255, the second device 265, the user device 275, and the second device 285 can be functionally and structurally similar to the first device 120, the second device 110, the user device 130, and the second device 110, respectively, of FIG. 1. The user device 275 can be functionally and structurally similar to the first device 255. Signal flow diagram 200B illustrates a process of a first device 255 encrypting data, sending the encrypted data to a user device 275 and the user device 275 decrypting the encrypted data. Steps illustrated in FIG. 2B as being performed by a device can be performed by hardware and/or software of that device. For example, steps performed by the first device 255 can be performed by a processor (e.g., processor 122 of FIG. 1) executing code stored in a memory (e.g., memory 124 of FIG. 1). Similarly, steps performed by the user device 275 can be performed by a processor (e.g., processor 132 of FIG. 1) executing code stored in a memory (e.g., memory 134 of FIG. 1).

At 230, the user U1 can submit a request to send data to user U2 at the first device 255. In some instances, the user U1 can provide the data to the first device 255. In some instances, the first device 255 can retrieve the data from a non-volatile memory of the first device 255. In some instances, the first device 255 can retrieve the data from a different device (not shown in FIG. 2B) and/or a database (e.g., database 140 of FIG. 1 and/or another database). After retrieving the data, the first device 255 can store the data at, for example, a volatile memory of the first device 255.

At 232, in response to the request, the first device 255 can submit a request to the second device 265 for a symmetric key of the second device 265. For example, the second device 265 can store a symmetric key (e.g., symmetric cryptographic key 113 of FIG. 1) in a non-volatile memory (e.g., non-volatile memory 112 of FIG. 1).

At 234, in response to the request, the second device 265 can send the symmetric key from a non-volatile memory of the second device 265 to the first device 255. Specifically, when the second device 265 is connected to the first device 255 (e.g., physically and/or securely communicatively), the second device 265 can send the symmetric key to the first device 255 upon receiving the request at 204.

The first device 255 can store the symmetric key at a volatile memory of the first device 255. The first device 255 can also store a public key of the user U2 at a volatile memory (e.g., volatile memory 125 of FIG. 1) and/or non-volatile memory (e.g., non-volatile memory 126 of FIG. 1) of the first device 255.

At 236, the first device 255 (e.g., using a processor such as processor 122 of FIG. 1) can encrypt the data with the public key of the user U2 to produce intermediate data. Such encryption can be performed using any suitable asymmetric encryption method and/or algorithm as described herein. The intermediate data can be stored in the memory (e.g., volatile memory and/or non-volatile memory) of the first device 255.

At 238, the first device 255 can encrypt the intermediate data with the symmetric key to produce encrypted data. Such encryption can be performed using any suitable symmetric encryption method and/or algorithm as described herein. The encrypted data can be stored in the memory (e.g., volatile memory and/or non-volatile memory) of the first device 255. In some implementations, after encryption of the data, the symmetric key can be removed from the memory of the first device 255.

At 240, the first device 255 can send the encrypted data to the user device 275. The user device 275 can store the encrypted data at a memory (e.g., the memory 134 of FIG. 1) of the user device 275. The memory can include a volatile memory and/or a non-volatile memory. While shown in FIG. 2B as the first device 255 sending the encrypted data directly to the user device 275, in some implementations the first device 255 can first store the encrypted data before the user device 275 retrieves the encrypted data. For example, the first device 255 can store the encrypted data in a database (e.g., database 140 of FIG. 1). At a later time, the user device can retrieve the encrypted data from the database.

At 242, the user device 275 can send a request to the second device 285 for a symmetric key of the second device 285. The symmetric key of the second device 285 can be identical to the symmetric key of the second device 265. At 244, in response to the request, the second device 285 can send the symmetric key from a non-volatile memory of the second device 285 to the user device 275. The user device 275 can store the symmetric key at the volatile memory of the user device 275. The user device 275 can also store a private key of the user U2 (paired with the public key of the user U2) at the volatile memory and/or non-volatile memory of the user device 275.

At 246, the user device 275 can decrypt the encrypted data using the symmetric key to produce intermediate data. Such decryption can be performed using any suitable symmetric decryption method and/or algorithm as described herein. The intermediate data can be stored in the memory (e.g., volatile memory and/or non-volatile memory) of the user device 275. In some implementations, after decryption of the data using the symmetric key, the symmetric key can be removed from the memory of the user device 275.

At 248, the user device 275 can decrypt the intermediate data using the private key of the user U2 to produce unencrypted or decrypted data. Such decryption can be performed using any suitable asymmetric decryption method and/or algorithm as described herein. The intermediate data can be stored in the memory (e.g., volatile memory and/or non-volatile memory) of the user device 275. At 250, the user device 275 can send the decrypted data to the user U2 via an output device (e.g., display, speaker, etc.) of the user device 275.

In some implementations, throughout the encryption processes, the first device 255 can monitor the presence of the second device 265 via a heartbeat monitor (e.g., heartbeat monitor 127 of FIG. 1). If the heartbeat monitor does not detect the presence of the second device 265 (e.g., does not receive a heartbeat signal as described herein), the first device 255 can remove the symmetric key from the volatile memory of the first device 255 and halt encryption.

Similarly, in some implementations, throughout the decryption process, the user device 275 can monitor the presence of the second device 285 via a heartbeat monitor (e.g., heartbeat monitor 127 of FIG. 1). If the heartbeat monitor does not detect the presence of the second device 285 (e.g., does not receive a heartbeat signal as described herein), the user device 275 can remove the symmetric key from the volatile memory of the user device 275 and halt decryption.

In some implementations, the second device 265 and/or the second device 285 can have and/or store a unique serial number and/or identifier. In some implementations, the first device 255 can confirm the serial number and/or identifier of the second device 265 to ensure the correct second device 265 is coupled to the first device 255. This can ensure that the correct symmetric cryptographic key is used to encrypt and/or decrypt data. The heartbeat monitor of the first device 255 can also use the serial number and/or identifier of the second device 265 to confirm the correct second device is connected to continue encryption and/or decryption. More specifically, the heartbeat monitor of the first device 255 can periodically, sporadically and/or continuously send a request to the second device 265 for the serial number and/or identifier of the second device 265. In response, the second device 265 can send the serial number and/or identifier of the second device 265 to the first device 255. The processor of the first device 255 can compare the received serial number and/or identifier of the second device 265 to an expected serial number and/or identifier (e.g., stored in a memory (e.g., non-volatile memory) of the first device 255). If the serial numbers and/or identifiers match, the encryption and/or decryption process can continue. If, however, the serial numbers and/or identifiers don't match, the encryption and/or decryption process can be halted and the symmetric key can be removed from the memory of the first device 255. Similarly, the user device 275 can confirm the serial number and/or identifier of the second device 285. This process can ensure that the correct second device is coupled to the correct first device and/or user device.

While shown and described in FIG. 2B as the user U1 encrypting data and sending the encrypted data to the user U2, in some implementations, the user U2 can encrypt data and send the encrypted data to the user U1. Similarly, while shown and described in FIG. 2B as the user U2 decrypting the encrypted data after receiving the encrypted data from the user U1, in some implementations, the user U1 can decrypt the encrypted data after receiving the encrypted data from the user U2. In such implementations, the asymmetric encryption can use a public key of user U1 and the asymmetric decryption can use a private key of user U1.

While shown and described in FIG. 2B as first encrypting the data with a user's public key to produce intermediate data and then encrypting the intermediate data with the symmetric key to produce encrypted data, in some implementations the data can be first encrypted using the symmetric key to produce intermediate data and then encrypting the intermediate data using the user's public key to produce encrypted data. Similarly, while shown and described in FIG. 2B as first decrypting the encrypted data with the symmetric key to produce intermediate data and then decrypting the intermediate data with the user's private key to produce decrypted data, in some implementations the data can be first decrypted using the user's private key to produce intermediate data and then decrypting the intermediate data using the symmetric key to produce decrypted data.

While shown in FIG. 2B as having a second device 265 and a second device 285, in some implementations a single second device can be operatively and/or communicatively coupled to both the first device 255 and the user device 275. For example, the first device 255 and the user device 275 can be connected to the same second device storing a symmetric key via a network (e.g., a secure intranet). The first device 255 and the user device 275 can access the second device (and the symmetric key) via the network. Additionally, in some implementations, a heartbeat signal associated with the second device can be detected via the network at the first device 255 and/or the user device 275 during encryption and/or decryption.

Figure 3:
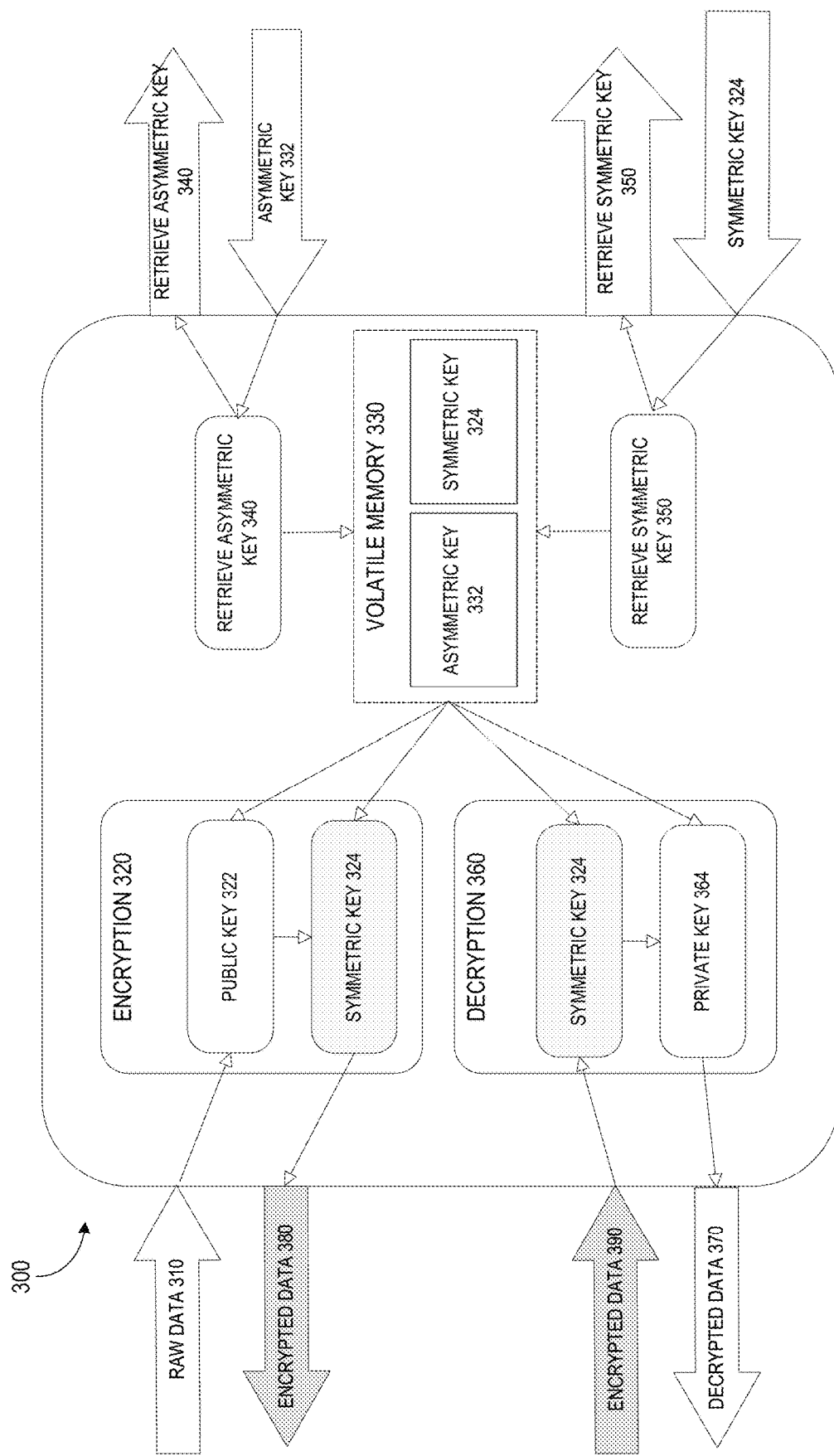
FIG. 3 shows a diagram illustrating an active cryptographic service, according to an embodiment.

FIG. 3 shows a diagram illustrating an active cryptographic service 300, according to an embodiment. The active cryptographic service 300 can include encryption 320 and decryption 360.

The active cryptographic service 300 can be implemented by a first device (e.g., the first device 120 of FIG. 1) and a second device (e.g., the second device 110 of FIG. 1). The first device is physically coupled and/or securely communicatively coupled (e.g., via a network) to the second device.

The first device can include a processor (e.g., the processor 122 of FIG. 1), a memory (e.g., the memory 124 of FIG. 1), and a heartbeat monitor (e.g., the heartbeat monitor 127 of FIG. 1). The processor of the first device can execute instructions and/or code related to encryption 320 and/or decryption 360. The memory of the first device can include a non-volatile memory (not shown) (e.g., the non-volatile memory 126 of FIG. 1) and a volatile memory 330 (e.g., the volatile memory 125 of FIG. 1). The memory of the first device can store instructions and/or code related to encryption 320 and/or decryption 360. The memory of the first device can also store data including raw data 310, encrypted data 380, and/or decrypted data 370. The memory of the first device can also store cryptographic keys including an asymmetric key 332 and a symmetric key 324. The asymmetric key 332 can be a public key 322 and/or a private key 364.

The second device can include a non-volatile memory (e.g., the non-volatile memory 112 of FIG. 1). The non-volatile memory of the second device can store the symmetric key 324 (e.g., the symmetric cryptographic key 113 of FIG. 1). The heartbeat monitor of the first device can detect the presence of the second device (e.g., the heartbeat signal described herein) while the second device is physically coupled and/or communicatively coupled to the first device. The active cryptographic service 300 represents implementations where the heartbeat monitor of the first device can detect the presence of the second device.

The first device can receive raw data 310. In some instances, the first device can receive raw data from a device with a memory, the device being communicatively coupled to the first device (e.g., via a network), such as a database (e.g., the database 140 of FIG. 1), a server (not shown), a user compute device (e.g., the user device 130 of FIG. 1) and/or the like. In some instances, the first device can receive raw data 310 via an input device directly from a user (e.g., via a keyboard, mouse, touchscreen, microphone, imaging device, etc.). In some instances, the raw data 310 includes a request to encrypt the raw data 310. In some instances, the first device can also receive a request to encrypt the raw data 310 independently of the raw data 310.

In response to receiving raw data 310 and/or a request to encrypt the raw data 310, the processor of the first device can execute instructions related to encryption 320. The instructions can include retrieving the asymmetric key 332 and storing the asymmetric key 332 in the volatile memory 330 (via retrieve asymmetric key 340). In some instances, the processor can retrieve the asymmetric key 332 from the non-volatile memory of the first device. In some instances, the asymmetric key 332 can be the public key 322 corresponding to and/or paired with the private key that will be used for decryption. In some instances, for example, the public key 322 can be the public key 322 of a compute device communicatively coupled to the first device and to which the first device is sending the data. In some instances, the public key 322 can be a public key of the first device.

The instructions can also include retrieving the symmetric key 324 from the non-volatile memory of the second device and storing the symmetric key 324 in the volatile memory 330 (via retrieve symmetric key 350). In some instances, the asymmetric key 332 and/or the symmetric key 324 can be stored in a non-volatile memory (not shown in FIG. 3) of the first device.

The processor of the first device can use the public key 322 to encrypt the raw data 310 to produce intermediate data. Such encryption can be performed using any suitable asymmetric decryption method and/or algorithm as described herein. The processor of the first device can then use the symmetric key 324 to encrypt the intermediate data to produce encrypted data 380. Such encryption can be performed using any suitable symmetric decryption method and/or algorithm as described herein. Throughout the process of encryption, including asymmetric encryption and symmetric encryption, the heartbeat monitor can periodically, sporadically and/or continuously detect that the second device is connected to the first device and can halt the encryption process if the second device is not detected. After producing the encrypted data 380, the processor can remove the symmetric key 324 from the volatile memory 330. In some instances, the processor can store the encrypted data 380 at the memory of the first device, including the non-volatile memory. In some instances, the processor can send the encrypted data 380 to another device (e.g., another compute device, a database, etc.).

When performing decryption, the first device can receive encrypted data 390. In some instances, the first device can receive encrypted data from another device (e.g., another compute device, a database, etc.). In some instances, the encrypted data 390 includes a request to decrypt the encrypted data 390. In some instances, the first device can also receive a request to decrypt the encrypted data 390 independently of the encrypted data 390.

In response to receiving the encrypted data 390 and/or a request to decrypt the encrypted data 390, the processor of the first device can execute instructions related to decryption 360. The instructions can include retrieving the symmetric key 324 from the non-volatile memory of the second device and storing the symmetric key 324 in the volatile memory 330 (via retrieve symmetric key 350). The instructions can include retrieving the asymmetric key 332 and storing the asymmetric key 332 in the volatile memory 330 (via retrieve asymmetric key 340). In some instances, the processor can retrieve the asymmetric key 332 from the non-volatile memory of the first device. The asymmetric key 332 can be the private key 364 paired to the public key used to encrypt the data. For example, in some instances, the asymmetric key 332 can be the private key 364 of the first device where encryption of the data used the public key of the first device. In some instances, the private key 364 can be a private key of a compute device communicatively coupled to the first device where encryption of the data used the public key of such compute device. In some instances, the asymmetric key 332 and/or the symmetric key 324 can be stored in a non-volatile memory of the first device.

The processor of the first device can use the symmetric key 324 to decrypt the encrypted data 390 to produce intermediate data. Such decryption can be performed using any suitable symmetric decryption method and/or algorithm as described herein. The processor of the first device can then use the private key 364 to decrypt the intermediate data to produce decrypted data 370. Such decryption can be performed using any suitable asymmetric decryption method and/or algorithm as described herein. Throughout the process of decryption, including symmetric decryption and asymmetric decryption, the heartbeat monitor can periodically, sporadically and/or continuously detect that the second device is connected to the first device and can halt the decryption process if the second device is not detected. After producing the decrypted data 370, the processor can remove the symmetric key 324 from the volatile memory 330. In some instances, the processor can store the decrypted data 370 at the memory of the first device, including the non-volatile memory. In some instances, the processor can send the decrypted data 370 to another device (e.g., another compute device, a database, etc.).

While shown and described in FIG. 3 as first encrypting the data with a public key 322 to produce intermediate data and then encrypting the intermediate data with the symmetric key 324 to produce encrypted data, in some implementations the data can be first encrypted using the symmetric key 324 to produce intermediate data and then encrypting the intermediate data using the public key 322 to produce encrypted data. Similarly, while shown and described in FIG. 3 as first decrypting the encrypted data with the symmetric key 324 to produce intermediate data and then decrypting the intermediate data with the private key 364 to produce decrypted data, in some implementations the data can be first decrypted using the private key 364 to produce intermediate data and then decrypting the intermediate data using the symmetric key 324 to produce decrypted data.

Figure 4:
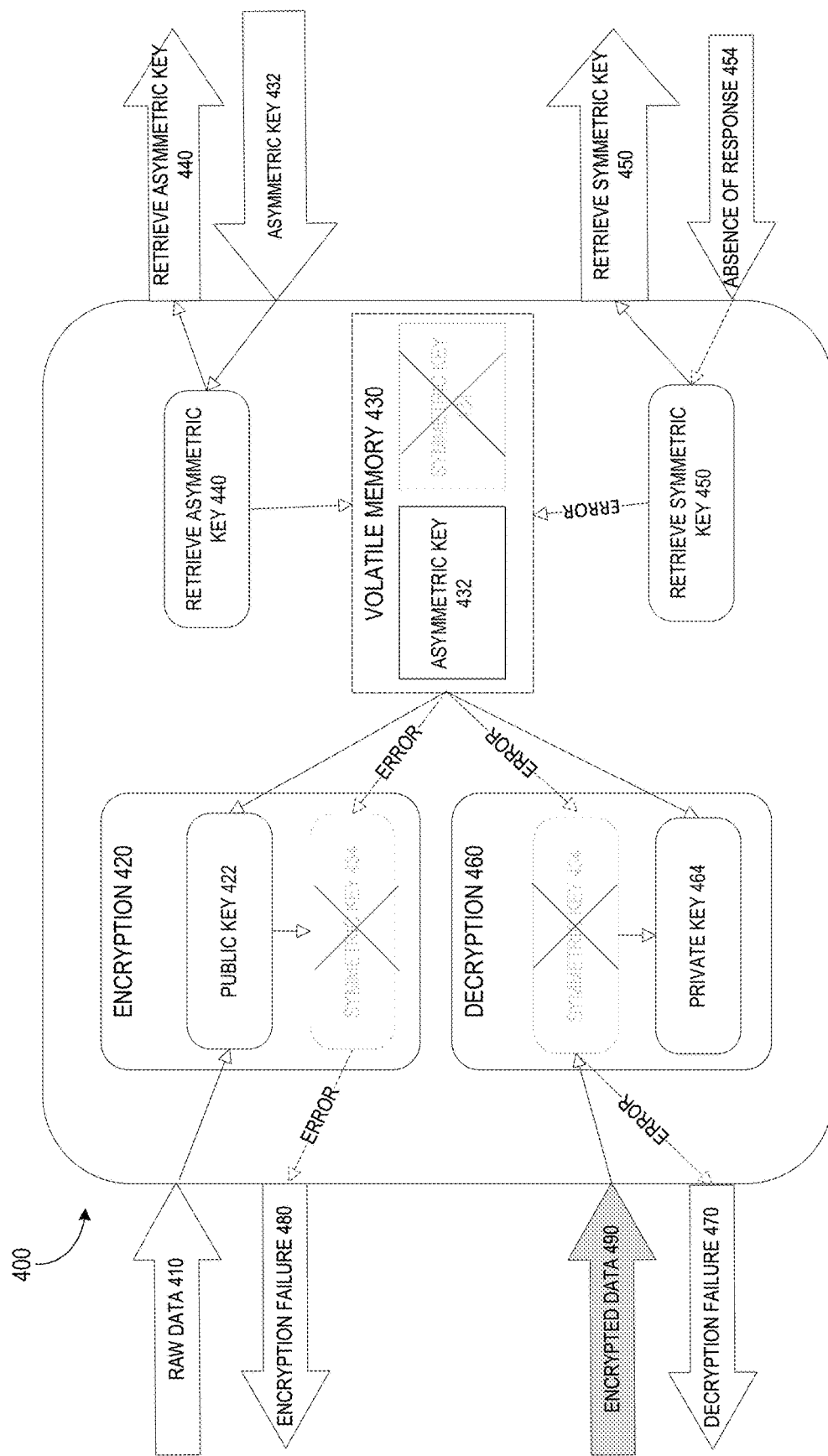
FIG. 4 shows a diagram illustrating an inactive cryptographic service, according to an embodiment.

FIG. 4 shows a diagram illustrating an inactive cryptographic service 400, according to an embodiment. The inactive cryptographic service 400 can be implemented by a first device (e.g., the first device 120 of FIG. 1) and a second device (e.g., the second device 110 of FIG. 1). The first device is not physically coupled and is not communicatively coupled (e.g., via a network) to the second device. Stated in another way, the first device is not coupled to the second device. In some instances, the first device can be coupled to the second device at a first time such that an implementation is representative of an active cryptographic service (e.g., the active cryptographic service 300 of FIG. 3), and then the first device can be uncoupled from the second device at a second time after the first time such that the implementation is representative of the inactive cryptographic service 400.

The first device can include a processor (e.g., the processor 122 of FIG. 1), a memory (e.g., the memory 124 of FIG. 1), and a heartbeat monitor (e.g., the heartbeat monitor 127 of FIG. 1). The processor of the first device can execute instruction and/or code related to encryption 420 and/or decryption 460. The memory of the first device can include a non-volatile memory (not shown) (e.g., the non-volatile memory 126 of FIG. 1) and a volatile memory 430 (e.g., the volatile memory 125 of FIG. 1). The memory of the first device can store instructions and/or code related to encryption 420 and/or decryption 460. The memory of the first device can also store data including raw data 410, encrypted data 490, and/or decrypted data. In some implementations, the memory of the first device does not store the symmetric key 424 when the second device is not coupled to the first device. In some implementations, the memory of the first device can also store an asymmetric key 432. The asymmetric key 432 can be either a public key 422 or a private key 464.

The second device can include a non-volatile memory (e.g., the non-volatile memory 112 of FIG. 1). The non-volatile memory of the second device can store the symmetric key 424 (e.g., the symmetric cryptographic key 113 of FIG. 1) when the second device is coupled to the first device. The heartbeat monitor of the first device can detect the presence of the second device (e.g., the heartbeat signal described herein) while the second device is physically coupled and/or communicatively coupled to the first device. The inactive cryptographic service 400 represents implementations where the heartbeat monitor of the first device can detect an absence of the presence of the second device.

The first device can receive raw data 410. In some instances, the first device can receive raw data from a device with a memory, the device being communicatively coupled to the first device (e.g., via a network), such as a database (e.g., the database 140 of FIG. 1), a server (not shown), a user compute device (e.g., the user device 130 of FIG. 1) and/or the like. In some instances, the first device can receive raw data 310 via an input device directly from a user (e.g., via a keyboard, mouse, touchscreen, microphone, imaging device, etc.). In some instances, the raw data 410 includes a request to encrypt the raw data 410. In some instances, the first device can also receive a request to encrypt the raw data 410 independently of the raw data 410.

In response to receiving raw data 410 and/or a request to encrypt the raw data 410, the processor of the first device can execute instructions related to encryption 420. The instructions can include retrieving the asymmetric key 432 and storing the asymmetric key 432 in the volatile memory 430 (via retrieve asymmetric key 440). In some instances, the processor can retrieve the asymmetric key 432 from the non-volatile memory of the first device. The asymmetric key 432 can be the public key 422. The instructions can also include attempting to retrieve the symmetric key 424 from the non-volatile memory of the second device. In response to an absence of a response from the second device 454, the processor can propagate a retrieval error message and/or code throughout the first device. In some instances, the retrieval error can halt encryption 420 in real-time or substantially real-time. In some instances, the processor can send an indication of an encryption failure 480 from the first device.

When performing decryption, in response to receiving the encrypted data 490 and/or a request to encrypt the encrypted data 490, the processor of the first device can execute instructions related to decryption 460. The instructions can include attempting to retrieve the symmetric key 424 from the non-volatile memory of the second device. In response to an absence of a response from the second device 454, the processor can propagate a retrieval error message and/or code throughout the first device. In some instances, the retrieval error can halt decryption 460 in real-time or substantially real-time. In some instances, the processor can send an indication of a decryption failure 470 from the first device.

In some implementations, the first device can transition from a first configuration (shown in FIG. 3) to a second configuration (shown in FIG. 4) when the heartbeat signal fails to detect the second device. Specifically, if the second device is removed from being physically and/or communicatively coupled to the first device, the heartbeat signal can detect the absence of the second device and move from the first configuration (in which encryption and/or decryption is being performed) to the second configuration (in which an error message is produced). When moving from the first configuration (FIG. 3) to the second configuration (FIG. 4), the symmetric key 434 can be removed from the memory and encryption and/or decryption can be halted.

Figure 5:
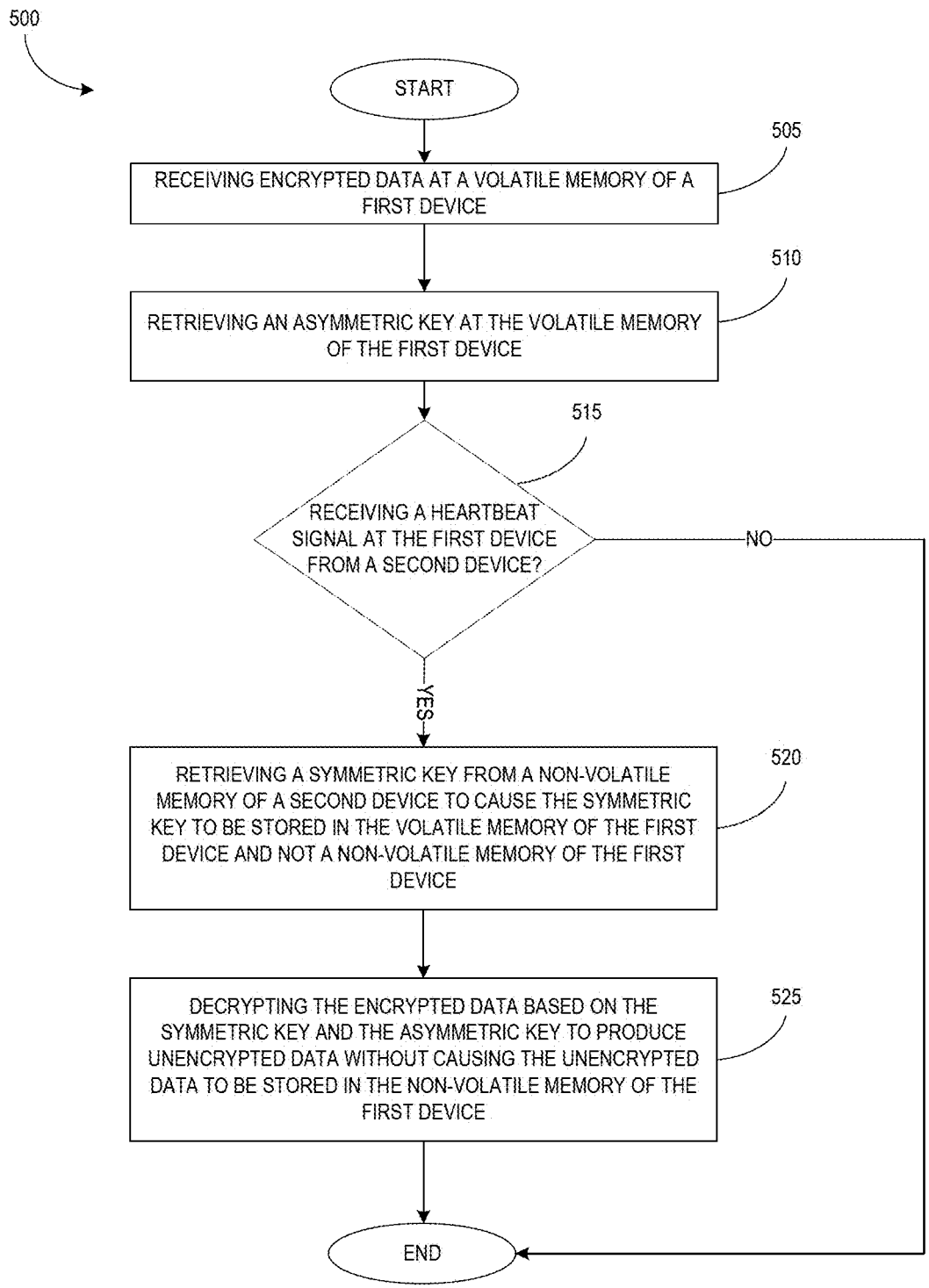
FIG. 5 shows a flow diagram illustrating a method for decryption, according to an embodiment.

FIG. 5 shows a flow diagram illustrating a method 500 for decryption, according to an embodiment. The method 500 can be stored as code in a memory (e.g., memory 124 of FIG. 1) and implemented by a processor of a first device (e.g., the processor 122 of FIG. 1). The first device can be physically and/or communicatively coupled to a second device (e.g., the second device 110 of FIG. 1). The second device can be removably coupled to the first device. The second device can include, for example, a removable USB drive, a PCIe drive, and/or a OTP memory.

At 505, the processor of the first device can receive encrypted data at a volatile memory (e.g., the volatile memory 125 of FIG. 1) of the first device. In some instances, the processor of the first device can receive a request from a user of the first device and/or from a user compute device (e.g., the user device 130 of FIG. 1) to decrypt the encrypted data. In some instances, the user compute device can cause the encrypted data to be sent to the first device. In some instances, the processor can receive the encrypted data from, for example, a database, a server, and/or another compute device operably coupled to the first device (e.g., via a network), without storing the encrypted data at a non-volatile memory of the first device (e.g., the non-volatile memory 126 of FIG. 1).

At 510, the processor of the first device can retrieve an asymmetric key at the volatile memory of the first device. The asymmetric key can be a private key of the first device. The private key can be mathematically related to a public key of the first device, the public key having been used to encrypt the encrypted data according to any suitable asymmetric encryption method and/or algorithm as described herein. In some instances, the first device and/or another compute device used the public key of the first device to encrypt the encrypted data. In some instances, the processor of the first device can retrieve the asymmetric cryptographic key at the volatile memory of the first device from, for example, a database, a server, and/or another compute drive operably coupled to the first device (e.g., via a network), without storing the asymmetric cryptographic key at the non-volatile memory of the first device.

At 515, the processor of the first device can communicate with a heartbeat monitor of the first device (e.g., the heartbeat monitor 127 of FIG. 1) to determine whether the heartbeat monitor can detect a presence of the second device (e.g., does or does not receive a heartbeat signal as described herein). If the heartbeat monitor does not detect the presence of the second device (e.g., does not receive a heartbeat signal as described herein), the processor of the first device can remove the symmetric key from the volatile memory of the first device and halt decryption. If the heartbeat monitor does detect the presence of the second device (e.g., does receive a heartbeat signal as described herein), the processor of the first device can continue decryption. In some implementations, the heartbeat monitor can periodically, sporadically and/or continuously detect the presence of the second device while performing the method 500.

At 520, the processor of the first device can retrieve a symmetric key (e.g., the symmetric cryptographic key 113 of FIG. 1) from a non-volatile memory of the second device (e.g., the non-volatile memory 112 of FIG. 1). The processor of the first device can store the symmetric key at the volatile memory of the first device and not at the non-volatile memory of the first device (e.g., the non-volatile memory 126 of FIG. 1).

At 525, the processor of the first device can decrypt the encrypted data using the symmetric key. Such decryption can be performed using any suitable symmetric decryption method and/or algorithm as described herein. The processor of the first device can also decrypt the encrypted data using the asymmetric key. Such decryption can be performed using any suitable asymmetric decryption method and/or algorithm as described herein. The processor can decrypt the encrypted data using the symmetric key and the asymmetric key to produce unencrypted data. In some implementations, after decryption of the encrypted data, the processor can deallocate the volatile memory of the first device to cause the symmetric key and/or the unencrypted data to be removed from the volatile memory of the first device.

In some implementations different entities and/or parties can have different symmetric keys stored on different second devices. In some implementations, the encryption and/or decryption using the different symmetric keys can be performed on a single and/or multiple first devices. For example, in some implementations of the method 500, there can be one or more entities, each entity associated with a different first device, a different second device, a different encrypted data, and a different unencrypted data. For example, in some implementations, the symmetric key can be a first symmetric cryptographic key, the second device can be associated with a first entity, the encrypted data can be first encrypted data associated with the first entity, and the unencrypted data can be first unencrypted data.

Similarly, in some implementations, the processor can receive second encrypted data at the volatile memory of the first device, the second encrypted data being associated with a second entity different from the first entity. The processor can retrieve a second symmetric cryptographic key from a non-volatile memory of a third device to cause the second symmetric cryptographic key to be stored in the volatile memory of the first device and not the non-volatile memory of the first device. The processor can decrypt the second encrypted data based on the asymmetric cryptographic key and the second symmetric cryptographic key to produce second unencrypted data, without causing the second unencrypted data to be stored in the non-volatile memory of the first device. The processor can prevent the first encrypted data from being decrypted based on the second symmetric cryptographic key.

Figure 6:
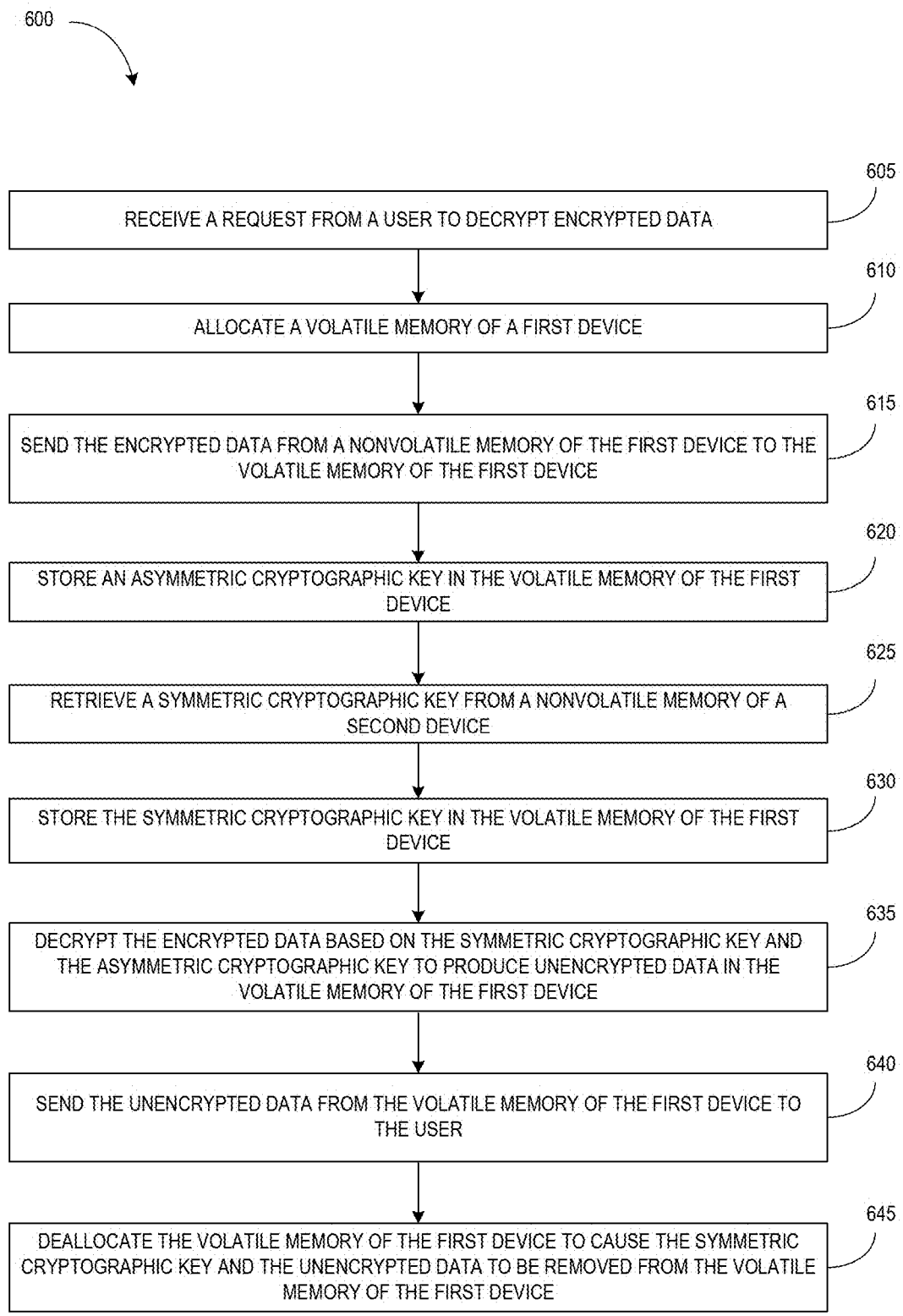
FIG. 6 shows a flow diagram illustrating a method for decryption, according to an embodiment.

FIG. 6 shows a flow diagram illustrating a method 600 for decryption, according to an embodiment. The method 600 can be stored as code in a memory (e.g., memory 124 of FIG. 1) and implemented by a processor of a compute device (e.g., the processor 122 of FIG. 1). The compute device can be physically and/or communicatively coupled to a second device (e.g., the second device 110 of FIG. 1). The second device can be removably coupled to the first device. The second device can include, for example, a removable USB drive, a PCIe drive, and/or a OTP memory.

At 605, the processor of the first device can receive a request from a user to decrypt encrypted data. In some instances, the processor of the first device can receive the request from a user of the first device and/or from a user compute device (e.g., the user device 130 of FIG. 1). In some instances, encrypted data can accompany the request of the user. In some instances, the first device can store the encrypted data at a non-volatile memory of the first device prior to or after receiving the request.

At 610, the processor of the first device can allocate a volatile memory of the first device (e.g., the volatile memory 125 of FIG. 1). The volatile memory can be allocated to store data, such as raw data, encrypted data, and/or decrypted data. The volatile memory can also be allocated to store cryptographic keys, such as asymmetric cryptographic keys including public keys and/or private keys, and a symmetric cryptographic key.

At 615, the processor can send the encrypted data from a non-volatile memory of the first device (e.g., the non-volatile memory 126 of FIG. 1) to the volatile memory of the first device. In some instances, the processor can retrieve the encrypted data from, for example, a database, a server, and/or another compute device operably coupled to the first device (e.g., via a network), without storing the encrypted data at the non-volatile memory of the first device.

At 620, the processor can store an asymmetric key in the volatile memory of the first device. The asymmetric key can be a private key of the first device. The private key can be mathematically related to a public key of the first device, the public key having been used to encrypt the encrypted data according to any suitable asymmetric encryption method and/or algorithm as described herein. In some instances, a user compute device produced the encrypted data using the public key of the first device. In some instances, the processor of the first device can retrieve the asymmetric cryptographic key at the volatile memory of the first device from, for example, a database, a server, and/or another compute device operably coupled to the first device (e.g., via a network), without storing the asymmetric cryptographic key at the non-volatile memory of the first device.

At 625, the processor can retrieve a symmetric key (e.g., the symmetric cryptographic key 113 of FIG. 1) from a non-volatile memory of the second device (e.g., the non-volatile memory 112 of FIG. 1). At 630, the processor of the first device can store the symmetric key in the volatile memory of the first device.

At 635, the processor of the first device can decrypt the encrypted data using the symmetric key. Such decryption can be performed using any suitable symmetric decryption method and/or algorithm as described herein. The processor of the first device can also decrypt the encrypted data using the asymmetric key. Such decryption can be performed using any suitable asymmetric decryption method and/or algorithm as described herein. The processor can decrypt the encrypted data using the symmetric key and the asymmetric key to produce unencrypted data.

At 640, the processor can cause the unencrypted data to be sent from the volatile memory of the first device to the user (e.g., via an output device (e.g., display, speaker, etc.), via a network to a user compute device, etc.).

At 645, the processor can deallocate the volatile memory of the first device to cause the symmetric cryptographic key and the unencrypted data to be removed from the volatile memory of the first device.

Figure 7:
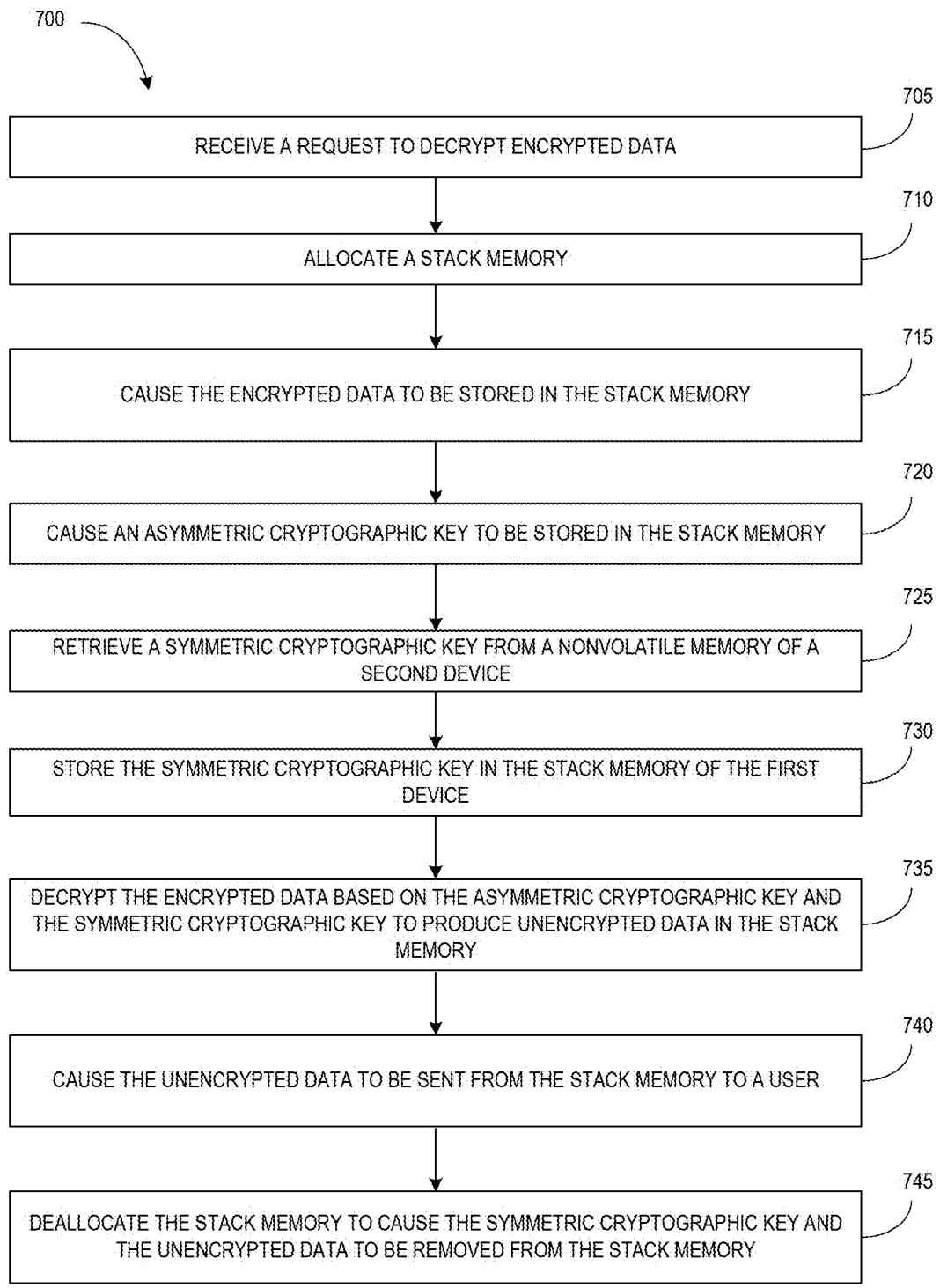
FIG. 7 shows a flow diagram illustrating a method for decryption, according to an embodiment.

FIG. 7 shows a flow diagram illustrating a method 700 for decryption, according to an embodiment. The method 700 can be stored as code in a memory (e.g., memory 124 of FIG. 1) and implemented by a processor of a first device (e.g., the processor 122 of FIG. 1). The first device can be physically and/or communicatively coupled to a second device (e.g., the second device 110 of FIG. 1). The second device can be removably coupled to the first device. The second device can include, for example, a removable USB drive, a PCIe drive, and/or a OTP memory.

At 705, the processor of the first device can receive a request to decrypt encrypted data. In some instances, the processor of the first device can receive the request from a user of the first device and/or from a user compute device (e.g., the user device 130 of FIG. 1). In some instances, encrypted data can accompany the request of the user. In some instances, the first device can store the encrypted data at a non-volatile memory of the first device prior to or after receiving the request.

At 710, the processor of the first device can allocate a stack memory of the first device (e.g., the volatile memory 125 of FIG. 1). The stack memory can be allocated to store data, such as raw data, encrypted data, and/or decrypted data. The stack memory can also be allocated to store cryptographic keys, such as asymmetric cryptographic keys including public keys and/or private keys, and a symmetric cryptographic key.

At 715, the processor can cause the encrypted data to be stored in the stack memory. Prior to storing the encrypted data in the stack memory, the processor can retrieve the encrypted data from, for example, the non-volatile memory of the first device. In some instances, the processor can retrieve the encrypted data from, for example, a database, a server, and/or another compute device operably coupled to the first device (e.g., via a network), without storing the encrypted data at the non-volatile memory of the first device.

At 720, the processor can cause an asymmetric key to be stored in the stack memory. The asymmetric key can be a private key of the first device. The private key can be mathematically related to a public key of the first device, the public key having been used to encrypt the encrypted data according to any suitable asymmetric encryption method and/or algorithm as described herein. In some instances, a user compute device could have used the public key of the first device to encrypt the encrypted data. In some instances, the processor of the first device can retrieve the asymmetric cryptographic key at the stack memory of the first device from, for example, a database, a server, and/or another compute drive operably coupled to the first device (e.g., via a network), without storing the asymmetric cryptographic key at a non-volatile memory of the first device (e.g., the non-volatile memory 126 of FIG. 1).

At 725, the processor can retrieve a symmetric key (e.g., the symmetric cryptographic key 113 of FIG. 1) from a non-volatile memory of the second device (e.g., the non-volatile memory 112 of FIG. 1). At 730, the processor of the first device can store the symmetric key at the stack memory.

At 735, the processor of the first device can decrypt the encrypted data using the asymmetric key. Such decryption can be performed using any suitable asymmetric decryption method and/or algorithm as described herein. The processor of the first device can also decrypt the encrypted data using the symmetric key. Such decryption can be performed using any suitable symmetric decryption method and/or algorithm as described herein. The processor can decrypt the encrypted data using the asymmetric key and the symmetric key to produce unencrypted data.

At 740, the processor can cause the unencrypted data to be sent from the stack memory to a user (e.g., via an output device (e.g., display, speaker, etc.) of the first device. At 745, the processor can deallocate the stack memory of the first device to cause the symmetric key and/or the unencrypted data to be removed from the stack memory.

In some embodiments, a method includes receiving encrypted data at a volatile memory of a first device; in response to receiving the encrypted data at the volatile memory of the first device: retrieving an asymmetric cryptographic key at the volatile memory of the first device, and retrieving a symmetric cryptographic key from a non-volatile memory of a second device to cause the symmetric cryptographic key to be stored in the volatile memory of the first device and not a non-volatile memory of the first device; and decrypting the encrypted data based on the asymmetric cryptographic key and the symmetric cryptographic key to produce unencrypted data, without causing the unencrypted data to be stored in the non-volatile memory of the first device.

In some embodiments, the second device includes a removable Universal Serial Bus (USB) drive. In some embodiments, the second device includes a Peripheral Component Interconnect Express (PCIe) drive. In some embodiments, the non-volatile memory of the second device includes a one-time programmable (OTP) memory. In some embodiments, the second device is removably coupled to the first device.

In some embodiments, the method further includes: receiving a heartbeat signal at the first device and from the second device; and in response to detecting an absence of the heartbeat signal at the first device, causing at least one of the asymmetric cryptographic key or the symmetric cryptographic key to be removed from the volatile memory of the first device.

In some embodiments, the receiving the encrypted data includes receiving the encrypted data at the volatile memory of the first device from the non-volatile memory of the first device. In some embodiments, the receiving the encrypted data includes receiving the encrypted data at the volatile memory of the first device from a server operably coupled to the first device via a network, without storing the encrypted data at the non-volatile memory of the first device.

In some embodiments, the retrieving the asymmetric cryptographic key at the volatile memory of the first device includes retrieving the asymmetric cryptographic key at the volatile memory of the first device from a server operably coupled to the first device via a network, without storing the asymmetric cryptographic key at the non-volatile memory of the first device.

In some embodiments, the symmetric cryptographic key is a first symmetric cryptographic key; the second device is associated with a first entity; the encrypted data is first encrypted data associated with the first entity; the unencrypted data is first unencrypted data; and the method further includes: receiving second encrypted data at a volatile memory of a first device, the second encrypted data being associated with a second entity different from the first entity; retrieving a second symmetric cryptographic key from a non-volatile memory of a third device to cause the second symmetric cryptographic key to be stored in the volatile memory of the first device and not the non-volatile memory of the first device, decrypting the second encrypted data based on the asymmetric cryptographic key and the second symmetric cryptographic key to produce second unencrypted data, without causing the second unencrypted data to be stored in the non-volatile memory of the first device, and preventing the first encrypted data from being decrypted based on the second symmetric cryptographic key.

In some embodiments, a non-transitory, processor-readable medium stores instructions that, when executed by a processor, cause the processor to: receive a request to decrypt encrypted data; in response to receiving the request: allocate a stack memory, cause the encrypted data to be stored in the stack memory, cause an asymmetric cryptographic key to be stored in the stack memory, and retrieve a symmetric cryptographic key from a non-volatile memory of a device that excludes the processor, to cause the symmetric cryptographic key to be stored in the stack memory; decrypt the encrypted data based on the asymmetric cryptographic key and the symmetric cryptographic key to produce unencrypted data in the stack memory; cause the unencrypted data to be sent from the stack memory to a user; and in response to causing the unencrypted data to be sent from the stack memory to the user, deallocate the stack memory to cause the symmetric cryptographic key and the unencrypted data to be removed from the stack memory.

In some embodiments, the device includes a removable Universal Serial Bus (USB) drive. In some embodiments, the device includes a Peripheral Component Interconnect Express (PCIe) drive. In some embodiments, the non-volatile memory of the device includes a one-time programmable (OTP) memory. In some embodiments, the device is a first device; a second device includes the processor; and the first device is removably coupled to the second device.

In some embodiments, the non-transitory, processor-readable medium, further stores instructions to cause the processor to: receive a heartbeat signal from the device; and in response to detecting an absence of the heartbeat signal, cause at least one of the asymmetric cryptographic key or the symmetric cryptographic key to be removed from the stack memory.

In some embodiments, an apparatus includes: a first device including a nonvolatile memory that stores a symmetric cryptographic key; and a second device including: a volatile memory, a nonvolatile memory, a processor, and a non-transitory, processor-readable medium storing instructions that, when executed by the processor, cause the processor to: receive a request from a user compute device to decrypt encrypted data; in response to receiving the request: allocate the volatile memory of the second device, cause the encrypted data to be sent from the nonvolatile memory of the second device to the volatile memory of the second device, cause an asymmetric cryptographic key to be stored in the volatile memory, and retrieve the symmetric cryptographic key from the nonvolatile memory of the first device to cause the symmetric cryptographic key to be stored in the volatile memory of the second device, decrypt the encrypted data based on the symmetric cryptographic key and the asymmetric cryptographic key to produce unencrypted data in the volatile memory of the second device, cause the unencrypted data to be sent from the volatile memory of the second device to a user, and in response to causing the unencrypted data to be sent to the user, deallocate the volatile memory of the second device to cause the symmetric cryptographic key and the unencrypted data to be removed from the volatile memory of the second device.

In some embodiments, the first device is removably coupled to the second device. In some embodiments, the volatile memory of the second device is a stack memory.

In some embodiments, the non-transitory, processor-readable medium further stores instructions to cause the processor to: in response to receiving the request, retrieve the encrypted data at the volatile memory of the second device from a server operably coupled to the second device via a network, without storing the encrypted data at the nonvolatile memory of the second device.

In some embodiments, the asymmetric cryptographic key is a private asymmetric cryptographic key from a private-public key pair that includes a public asymmetric cryptographic key; and the instructions to cause the processor to decrypt the encrypted data based on the symmetric cryptographic key and the asymmetric cryptographic key include instructions to cause the processor to: decrypt the encrypted data based on the symmetric cryptographic key to produce intermediate data, the encrypted data having been encrypted using the symmetric cryptographic key, and decrypt the intermediate data based on the private asymmetric cryptographic key to produce the unencrypted data, the intermediate data having been encrypted using the public asymmetric cryptographic key.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features can not necessarily be limited to a particular order of execution, but rather, any number of threads, processes, services, servers, and/or the like that can execute serially, asynchronously, concurrently, in parallel, simultaneously, synchronously, and/or the like in a manner consistent with the disclosure. As such, some of these features can be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of" "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium and/or a machine-readable medium) having instructions or computer code thereon for performing various computer-implemented operations. The computer-readable medium (or processor-readable medium, machine-readable medium, etc.) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules can include, for example, a processor, a field programmable gate array (FPGA), and/or an application specific integrated circuit (ASIC). Software modules (executed on hardware) can include instructions stored in a memory that is operably coupled to a processor and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. A method, comprising:
receiving encrypted data at a volatile memory of a first device;
in response to receiving the encrypted data at the volatile memory of the first device:
retrieving an asymmetric cryptographic key at the volatile memory of the first device, and
retrieving a symmetric cryptographic key from a non-volatile memory of a second device to cause the symmetric cryptographic key to be stored in the volatile memory of the first device and not a non-volatile memory of the first device;
decrypting the encrypted data based on the asymmetric cryptographic key and the symmetric cryptographic key to produce unencrypted data, without causing the unencrypted data to be stored in the non-volatile memory of the first device;
receiving a heartbeat signal at the first device and from the second device; and
in response to detecting an absence of the heartbeat signal at the first device, causing at least one of the asymmetric cryptographic key or the symmetric cryptographic key to be removed from the volatile memory of the first device.

2. The method of claim 1, wherein the second device includes a removable Universal Serial Bus (USB) drive.

3. The method of claim 1, wherein the second device includes a Peripheral Component Interconnect Express (PCIe) drive.

4. The method of claim 1, wherein the non-volatile memory of the second device includes a one-time programmable (OTP) memory.

5. The method of claim 1, wherein the second device is removably coupled to the first device.

6. The method of claim 1, wherein the receiving the encrypted data includes receiving the encrypted data at the volatile memory of the first device from the non-volatile memory of the first device.

7. The method of claim 1, wherein the receiving the encrypted data includes receiving the encrypted data at the volatile memory of the first device from a server operably coupled to the first device via a network, without storing the encrypted data at the non-volatile memory of the first device.

8. The method of claim 1, wherein the retrieving the asymmetric cryptographic key at the volatile memory of the first device includes retrieving the asymmetric cryptographic key at the volatile memory of the first device from a server operably coupled to the first device via a network, without storing the asymmetric cryptographic key at the non-volatile memory of the first device.

9. The method of claim 1, wherein:
the symmetric cryptographic key is a first symmetric cryptographic key;
the second device is associated with a first entity;
the encrypted data is first encrypted data associated with the first entity;
the unencrypted data is first unencrypted data; and
the method further comprises:
receiving second encrypted data at a volatile memory of a first device, the second encrypted data being associated with a second entity different from the first entity;
retrieving a second symmetric cryptographic key from a non-volatile memory of a third device to cause the second symmetric cryptographic key to be stored in the volatile memory of the first device and not the non-volatile memory of the first device,
decrypting the second encrypted data based on the asymmetric cryptographic key and the second symmetric cryptographic key to produce second unencrypted data, without causing the second unencrypted data to be stored in the non-volatile memory of the first device, and
preventing the first encrypted data from being decrypted based on the second symmetric cryptographic key.

10. A non-transitory, processor-readable medium storing instructions that, when executed by a processor, cause the processor to:
receive a request to decrypt encrypted data;
in response to receiving the request:
allocate a stack memory,
cause the encrypted data to be stored in the stack memory,
cause an asymmetric cryptographic key to be stored in the stack memory, and
retrieve a symmetric cryptographic key from a non-volatile memory of a device that excludes the processor, to cause the symmetric cryptographic key to be stored in the stack memory;
decrypt the encrypted data based on the asymmetric cryptographic key and the symmetric cryptographic key to produce unencrypted data in the stack memory;
cause the unencrypted data to be sent from the stack memory to a user;
in response to causing the unencrypted data to be sent from the stack memory to the user, deallocate the stack memory to cause the symmetric cryptographic key and the unencrypted data to be removed from the stack memory;
receive a heartbeat signal from the device; and
in response to detecting an absence of the heartbeat signal, cause at least one of the asymmetric cryptographic key or the symmetric cryptographic key to be removed from the stack memory.

11. The non-transitory, processor-readable medium of claim 10, wherein the device includes a removable Universal Serial Bus (USB) drive.

12. The non-transitory, processor-readable medium of claim 10, wherein the device includes a Peripheral Component Interconnect Express (PCIe) drive.

13. The non-transitory, processor-readable medium of claim 10, wherein the non-volatile memory of the device includes a one-time programmable (OTP) memory.

14. The non-transitory, processor-readable medium of claim 10, wherein:
the device is a first device;
a second device includes the processor; and
the first device is removably coupled to the second device.

15. A system, comprising:
a first device including a nonvolatile memory that stores a symmetric cryptographic key; and
a second device including:
a volatile memory,
a nonvolatile memory,
a processor, and
a non-transitory, processor-readable medium storing instructions that, when executed by the processor, cause the processor to:
receive a request from a user compute device to decrypt encrypted data;
in response to receiving the request:
allocate the volatile memory of the second device,
cause the encrypted data to be sent from the nonvolatile memory of the second device to the volatile memory of the second device,
cause an asymmetric cryptographic key to be stored in the volatile memory, and
retrieve the symmetric cryptographic key from the nonvolatile memory of the first device to cause the symmetric cryptographic key to be stored in the volatile memory of the second device,
decrypt the encrypted data based on the symmetric cryptographic key and the asymmetric cryptographic key to produce unencrypted data in the volatile memory of the second device,
cause the unencrypted data to be sent from the volatile memory of the second device to a user, and
in response to causing the unencrypted data to be sent to the user, deallocate the volatile memory of the second device to cause the symmetric cryptographic key and the unencrypted data to be removed from the volatile memory of the second device.

16. The system of claim 15, wherein the first device is removably coupled to the second device.

17. The system of claim 15, wherein the volatile memory of the second device is a stack memory.

18. The system of claim 15, wherein the non-transitory, processor-readable medium further stores instructions to cause the processor to:
in response to receiving the request, retrieve the encrypted data at the volatile memory of the second device from a server operably coupled to the second device via a network, without storing the encrypted data at the nonvolatile memory of the second device.

19. The system of claim 15, wherein:
the asymmetric cryptographic key is a private asymmetric cryptographic key from a private-public key pair that includes a public asymmetric cryptographic key; and
the instructions to cause the processor to decrypt the encrypted data based on the symmetric cryptographic key and the asymmetric cryptographic key include instructions to cause the processor to:
decrypt the encrypted data based on the symmetric cryptographic key to produce intermediate data, the encrypted data having been encrypted using the symmetric cryptographic key, and
decrypt the intermediate data based on the private asymmetric cryptographic key to produce the unencrypted data, the intermediate data having been encrypted using the public asymmetric cryptographic key.

\* \* \* \* \*